Figure 1:
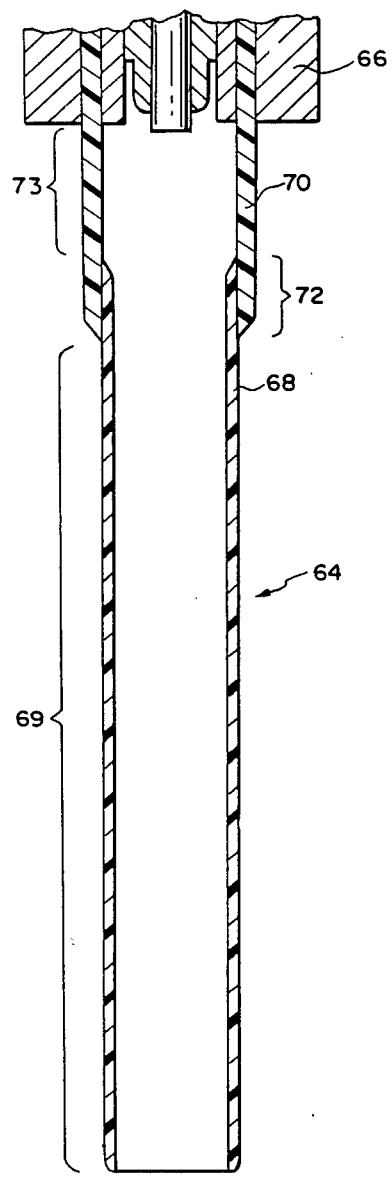

United States Patent [19]

Gokcen et al.

[11] Patent Number: 4,613,531
[45] Date of Patent: Sep. 23, 1986

[54] LAYERED THERMOPLASTIC ARTICLES AND METHOD FOR FORMING

[75] Inventors: Cem Gokcen, Norwich, England; Robert J. Williams, Chicago, Ill.

[73] Assignee: Baxter Travenol Laboratories, Inc., Deerfield, Ill.

[21] Appl. No.: 683,310

[22] Filed: Dec. 18, 1984

Related U.S. Application Data

[62] Division of Ser. No. 438,813, Nov. 3, 1982, Pat. No. 4,510,115.

[51] Int. Cl.$^4$ .................. B65D 23/00; B65D 51/00
[52] U.S. Cl. ................................ 428/35; 215/1 C; 215/232
[58] Field of Search ............... 428/35, 518; 215/1 C, 215/232; 426/123

[56] References Cited

U.S. PATENT DOCUMENTS

| | | | |
|---|---|---|---|
| 3,023,461 | 3/1962 | Sherman | 264/540 |
| 3,082,484 | 3/1963 | Sherman | 264/540 |
| 3,325,860 | 6/1967 | Hansen | 264/89 |
| 3,409,710 | 11/1968 | Klygis | 215/1 C |
| 3,457,337 | 7/1969 | Turner | 264/98 |
| 3,535,409 | 10/1970 | Rohde | 264/95 |
| 3,655,084 | 4/1972 | Willhaus et al. | 215/1 C |
| 3,792,144 | 2/1974 | Burkett et al. | 264/96 |
| 3,817,417 | 6/1974 | Edwards | 215/37 R |
| 3,851,029 | 11/1974 | Cornett, III et al. | 264/89 |
| 3,902,617 | 9/1975 | Valyi | 215/1 C |
| 3,919,374 | 11/1975 | Komendowski | 264/96 |
| 4,079,850 | 3/1978 | Suzuki et al. | 215/1 C |
| 4,131,211 | 12/1978 | Corbic | 215/2 |
| 4,176,153 | 11/1979 | Weiler et al. | 264/524 |
| 4,217,161 | 8/1980 | Yamada et al. | 428/474 |
| 4,239,726 | 12/1980 | Weiler et al. | 215/1 C |
| 4,265,693 | 5/1981 | Nishimoto et al. | 264/514 |
| 4,456,164 | 6/1984 | Foster et al. | 428/35 |

Primary Examiner—John E. Kittle
Assistant Examiner—James J. Seidleck
Attorney, Agent, or Firm—Paul C. Flattery; Bradford R. L. Price

[57] ABSTRACT

Layered thermoplastic articles (36) and a method for forming layered thermoplastic articles are provided. The method involves forming a layered, thermoplastic parison, followed by blow molding the parison in a mold cavity (10, 12) to form a desired configuration of hollow article (36). The blow molded articles (36) can be of any configuration achievable with known blow molding technology. Every section of the article (36) can be layered, or the article (36) can have selectively intermittent layered sections. The containers typically are used for storing and dispensing liquids and are of one-piece construction. In accordance with this invention, the thermoplastic materials (24, 26) are of a type which are incompatible.

1 Claim, 25 Drawing Figures

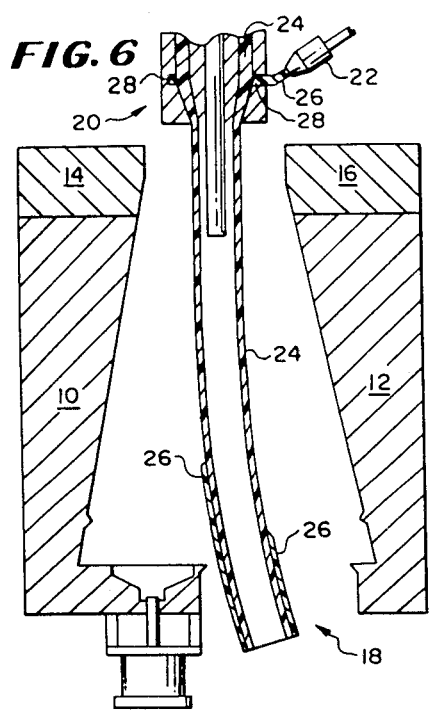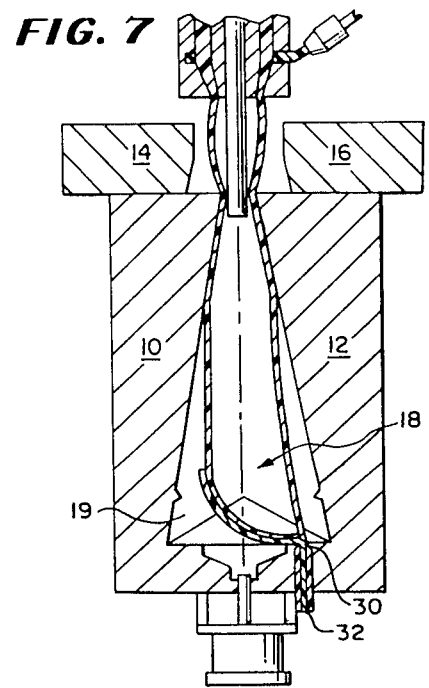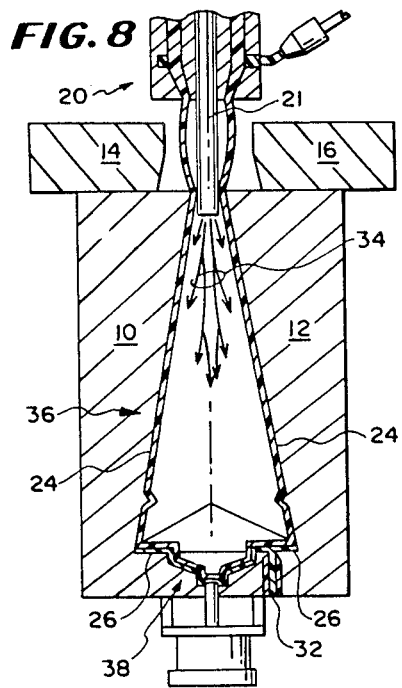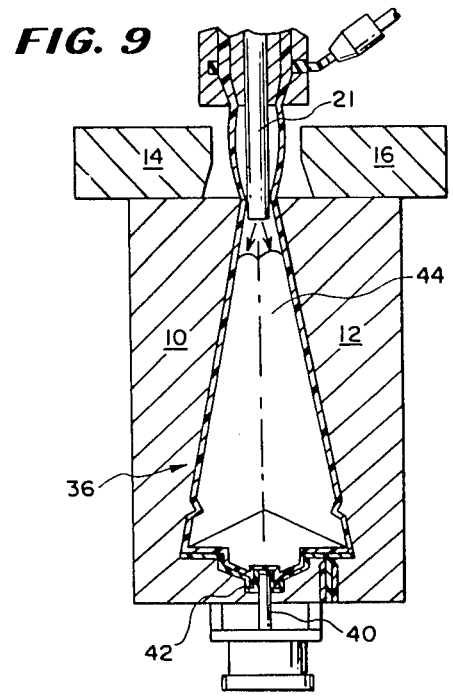

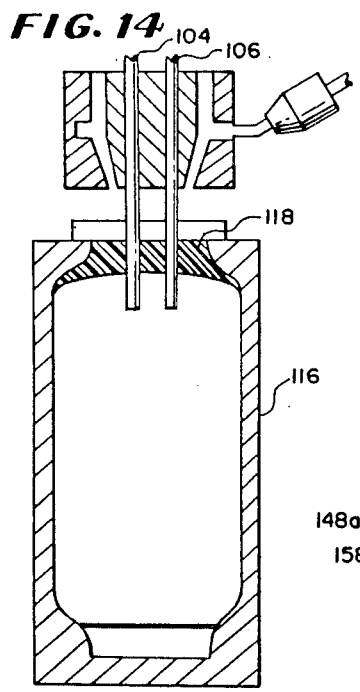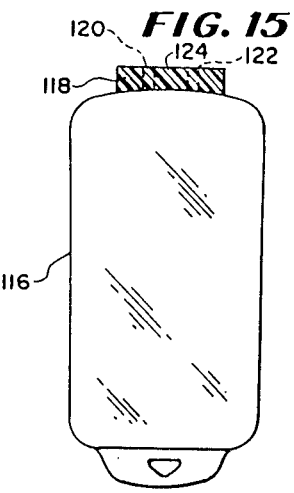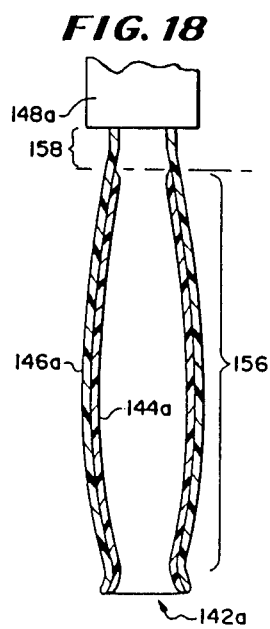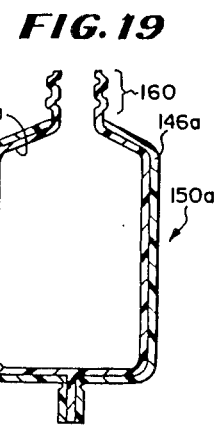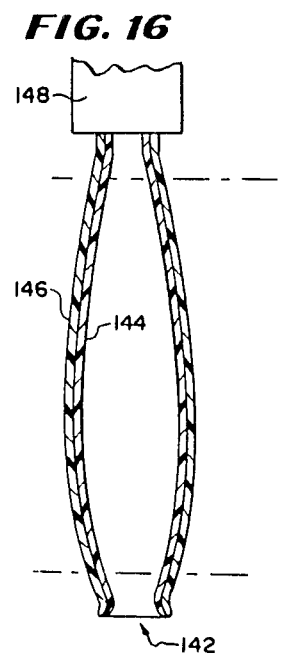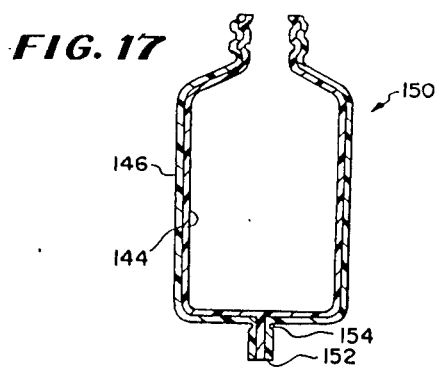

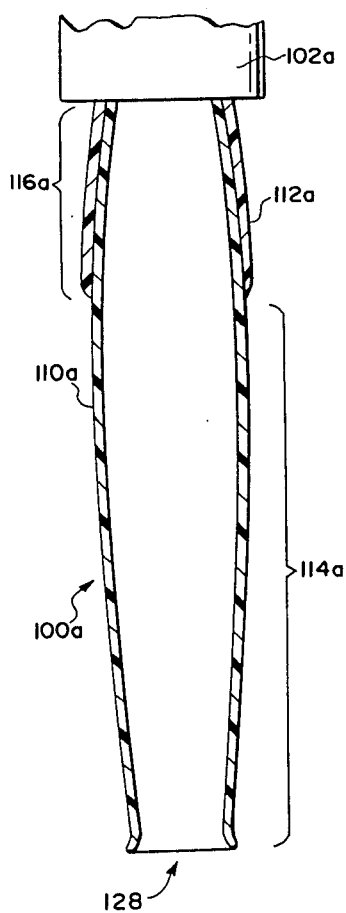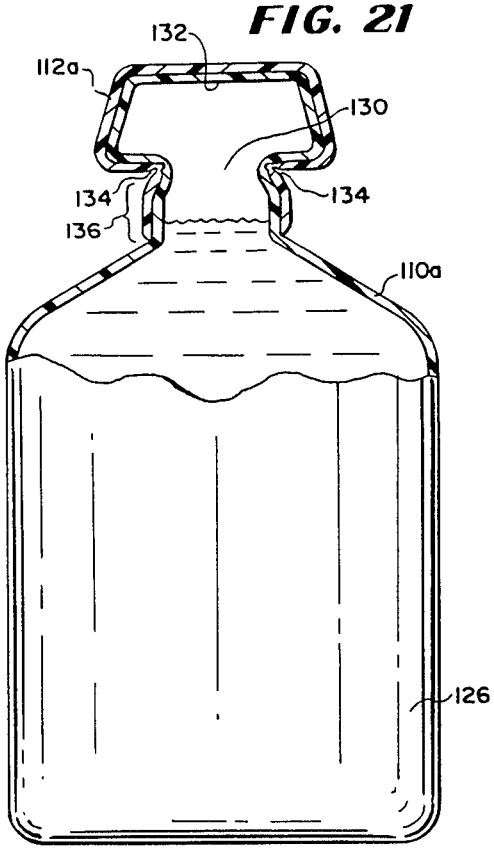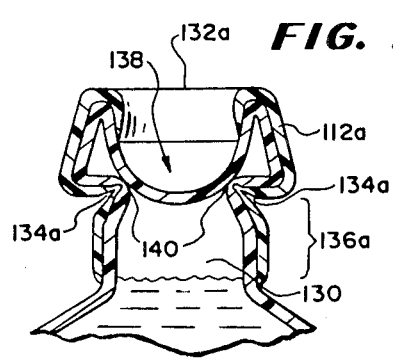

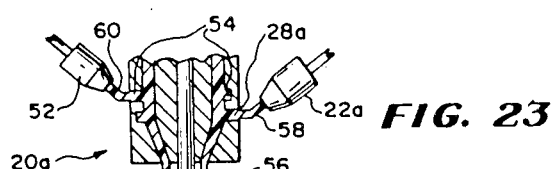
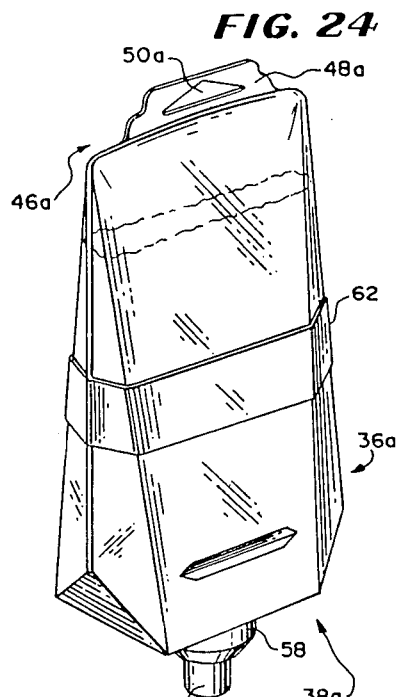
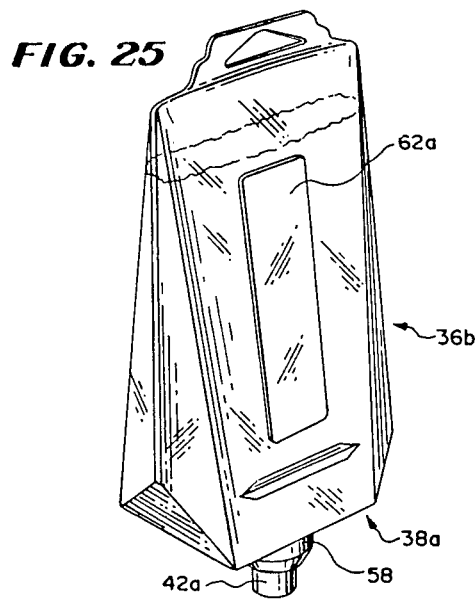

LAYERED THERMOPLASTIC ARTICLES AND METHOD FOR FORMING

This is a division of application Ser. No. 438,813, filed Nov. 3, 1982, now U.S. Pat. No. 4,510,115.

FIELD OF THE INVENTION

This invention relates generally to blow molding and it particularly relates to blow molding of novel, layered, hollow thermoplastic containers. The method involves initially forming a layered thermoplastic parison, followed by blow molding the parison in a mold cavity to form the desired configuration of hollow article. The blow molded articles can be of any configuration achievable with known blow molding technology. Every section of the article can be layered, or the article can have selectively intermittent layered sections. The containers typically are used for storing and dispensing liquids and are of one piece construction.

BACKGROUND OF THE INVENTION

Hollow, blow molded, thermoplastic articles enjoy widespread commercial acceptance because of ease of fabrication and reduced labor costs. Abundant applications for blow molded, thermoplastic articles are apparent in the medical field alone. Form, fill, and seal blow molded containers, designed for sterile and aseptic packaging of parenteral solutions and the like, are well known.

In certain applications, however, additional operations need to be performed on blow molded containers to decrease their water vapor permeability, decrease their permeability to gasses (especially oxygen), or provide a sterile surface on at least a portion of the outside of the container as may be desirable, particularly in the medical field. Additional layers of thermoplastic or adhesive material may be applied to blow molded containers in subsequent operations, after the article has been blown, in efforts to decrease permeability or provide a sterile surface. Subsequent operations, though, tend to be time consuming and labor intensive, thus increasing the cost of the completed article. Further still, when sterility is a factor, it is difficult to maintain acceptable control.

Heretofore, thermoplastic containers have had additional layers applied by methods such as dip coating, spray coating, shrink fit coating, or injection overmolding. See, for example, U.S. Pat. No. 3,457,337, *Method for Producing Coated Containers,* to Turner. Where gas permeability or water vapor permeability is important, outer layers of plastic material may be applied. Where medical uses are contemplated, the exterior of blow molded, thermoplastic containers can be sterilized by overcoating of the outer surface under sterile conditions or before terminal sterilization.

Plastic containers are often blow molded from a continuously extruded tube. Methods of coextrusion exist which comprise simultaneously extruding coaxial tubular members and then blow molding those members. Layered plastic containers are produced thereby, specifically to decrease gas or water vapor permeability of the container. See, for example, U.S. Pat. No. 4,079,850, *Multi-Layer Blow Molded Container and Process for Preparation Thereof,* to Suzuki, et al. and U.S. Pat. No. 3,457,337, *Method for producing coated Containers,* to Turner. Typically, though, the container layers are not easily separable or peelable because the thermoplastic materials used have been compatible, that is, they adhere at their interface.

By this invention layered, blow molded thermoplastic containers are produced by simultaneously feeding two thermoplastic materials, using existing injection or extrusion technology, into a blow molding die, extruding the simultaneously fed thermoplastic materials to form a layered parison, and then blow molding the parison.

As an additional feature, blow molded articles are provided which have the advantages of layered sealing systems without the need to provide subsequent, separate operations.

Another additional feature of the present invention is found in the flexibility afforded in locating layered sections. This invention provides a novel method of simultaneously feeding incompatible thermoplastic materials into a blow molding die to produce an optionally intermittently layered parison which is blow molded into an intermittently layered article.

Still another advantage of the present invention lies in the ability to produce a blow molded thermoplastic article with a peelable thermoplastic layer thereover, which is simultaneously blow molded with the article, and which maintains a sterile interface until removed.

Further features of the invention include providing containers with reduced gas permeability or water vapor permeability by blow molding layered, thermoplastic containers.

BRIEF SUMMARY OF THE INVENTION

The present invention provides a method of forming layered, hollow thermoplastic articles. The method involves controlled simultaneous feeding of at least two thermoplastic materials into a blow molding die and thereafter extruding the simultaneously fed thermoplastic materials from the blow molding die to form a layered, thermoplastic parison. Blow molding of the parison in a mold cavity follows, with the result being a hollow article of desired configuration. In accordance with this invention, the thermoplastic materials are of a type which are incompatible. The term incompatible is broadly used to designate thermoplastic materials exhibiting an adhesion bond between the materials which is weak enough to allow separation or peeling of the layers. Incompatible materials are defined as having a bond strength of 6.7 pounds per square inch or less as determined by ASTM Designation: D 952-51 (Reapproved 1961).

Simultaneous feeding of one or more of the thermoplastic materials into the blow molding die can be intermittent with a resulting extruded parison and completed article that is intermittently layered. Normal die programming means can precisely control the position and thickness of the layers of the parison and, hence, the position and thickness of layers on the completed articles. A large variety of articles unique to blow molding may be produced by the method of this invention.

By appropriate selection of incompatible thermoplastic materials, articles having removable or peelable outer layers may be obtained. The ease with which outer layers are removable depends, of course, upon the selection of thermoplastic materials. In addition to easily peelable outer layers, injection sites on medical containers made from thermoplastic elastomers may be made in accordance with this invention. In addition, feeding temperatures of at least about 350° F. for the fed, extruded thermoplastic materials can be used to molecular weight of about 400 to 6000: a diisocyanate or mixtures of diisocyanates; and the above-mentioned amide as a chain lengthening agent, optionally with further chain lengthening agents, preferably low molecular weight diols and in particular butane diol-1,4.

The amide may be produced in a straightforward manner by reacting 2,2-bis(hydroxymethyl)propionic acid methyl ester and ammonia. The melting point of the substance which was used for the experiments which are described hereinafter is from 174° to 175° C. and is thus higher than described in DE-A No. 2,621,284, thereby indicating a purer preparation.

isophorone diisocyanate, hexamethylene diisocyanate and trimethyl-hexamethylene diisocyanate, optionally as a mixture of the isomers or homologues thereof or as a mixture of various diisocyanates.

Polyesters, polyester amides, polyethers, polyacetals and polycarbonates, which are conventionally used in the production of polyurethanes, are suitable as relatively high molecular weight polyhydroxy compounds. Compounds having two hydroxyl groups per molecule are preferably used, especially those which have an average molecular weight ranging from about 400 to 6000, preferably from about 800 to 3000.

moplastic material 26 is shown covering bottom end 38 of container bag 36.

FIG. 9 shows container bag 36 after pin 40 has been used to form access port 42 on container bag 36. Filling with desired liquid 44 is accomplished through fill/blow tube 21.

Figure 10:
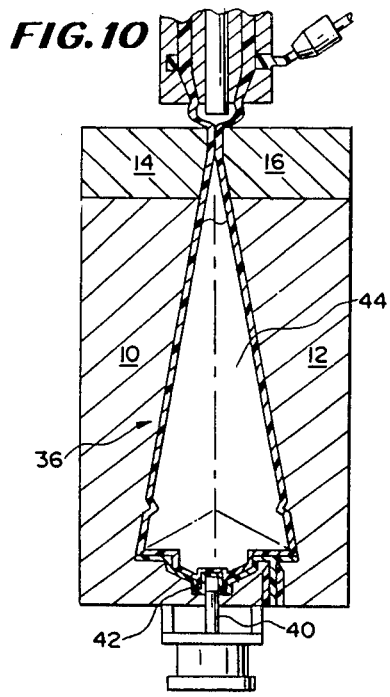

After container bag 36 has been completely filled with fluid contents 44, slide clamps 14, 16 are closed, as is shown in FIG. 10, to seal closed container bag 36. At the same time, pin 40 is retracted completing the formation of access port 42.

Figure 11:
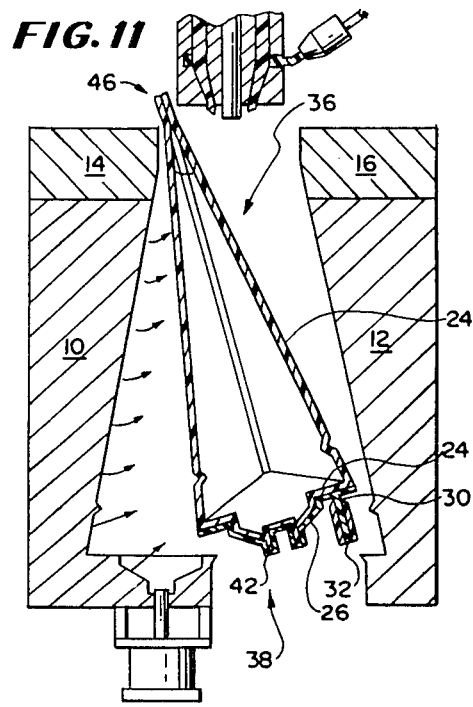

FIG. 11 shows a sealed container bag 36. Container bag 36 is then removed from between open mold cavity sections 10, 12.

Figure 12:
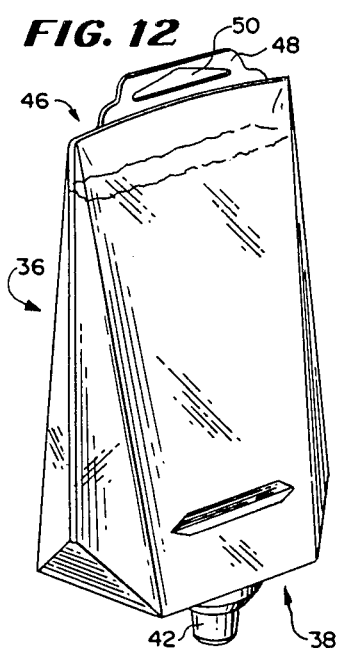
Figure 13:
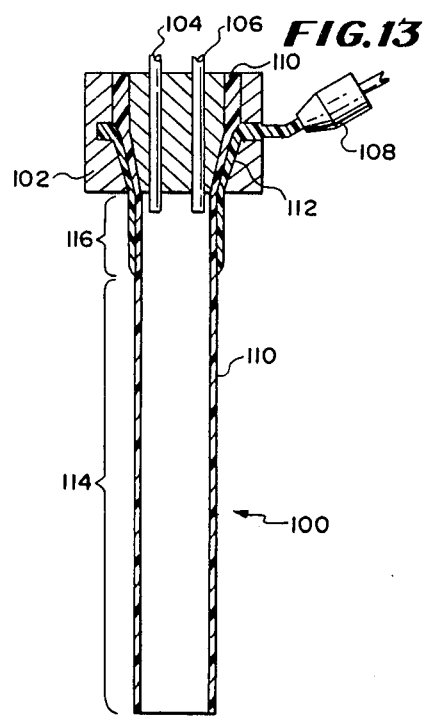

Completed container bag 36 is shown in FIGS. 11 and 12. Top end 46 has an extending tab 48 having opening 50. Bottom end 38 of container bag 36 is shown covered by second thermoplastic material 26. Access port 42 is also covered by second thermoplastic material 26. Tab 32, having frangible section 30, depends from bottom end 38 of container bag 36.

The container bag 36 formed by the method of this invention has integrally formed access port 42 covered by second thermoplastic material 26. Because of the high temperatures encountered during the feeding and extruding steps in the method of this invention, the interface between thermoplastic materials 24 and 26 is essentially sterile. Since the thermoplastic materials used are incompatible, thermoplastic material 26 may be peeled off the bottom end 38 and access port 42 of container bag 36 just prior to use, thereby offering a sterile surface.

Preferred incompatible thermoplastics 24, of which the container bag 36 is made, include polyolefins such as polypropylene, copolymers having a high polypropylene content, and polyethylene. Polycarbonates may also be used. Preferred incompatible thermoplastic materials for second thermoplastic material 26 which constitutes the outer, peelable layer, include polystyrene, ABS, polyvinylchloride, and fluoropolymers such as polyvinylidene fluoride. Styrene containing thermoplastic elastomers may also be compounded to be incompatible with the thermoplastic material of the container and thus usable.

Turning now to FIG. 23, an alternative embodiment is shown. This embodiment is substantially the same as the embodiment illustrated in FIGS. 6 through 12 except as otherwise described herein. Mold cavity sections 10a, 12a are shown having slide clamps 14a, 16a resting thereon. Parison 18a is shown between mold cavity sections 10a, 12a.

Nozzle 22a is shown connected to blow molding die 20a. A second Nozzle 52 is also shown connected to blow molding die 20a. Nozzle 22a feeds into annular reservoir 28a located in blow molding die 20a. Nozzle 52 feeds into reservoir 54 located in blow molding die 20a. Reservoir 54 may be completely annular, or it may be only a portion of an arc of an annulus.

In this embodiment, three thermoplastic materials have been fed into blow molding die 20a. Feeding of first thermoplastic material 56 is continuous while simultaneous feeding of second thermoplastic material 58 and third thermoplastic material 60 are intermittent. Parison 18a is comprised of first thermoplastic material 56 covered in sections by second thermoplastic material 58 and third thermoplastic material 60.

The article blow molded from parison 18a of FIG. 23 is shown in FIG. 24. Container bag 36a is shown having extending tab 48a having opening 50a at top end 46a. Access port 42a is shown in bottom end 38a of container bag 36a. Thermoplastic material 60 (FIG. 23) made for example of Kraton G (a trademarked plastic manufactured by Shell Oil Company) thermoplastic rubber, forms injection strip 62 on the container bag. Similarly, other known elastomeric materials, for example EVA, may also be used to form injection strips. Injection strip 62 can be used as a sterile injection site for injecting an additive, such as a medicament, into container bag 36a. Access port 42a and bottom end 38a are provided with a peelable layer formed from thermoplastic material 58.

FIG. 25 shows an alternative configuration of the container bag shown in FIG. 24. Container bag 36b is shown with an injection strip 62a formed by feeding third thermoplastic material 60 into a reservoir that is only a portion of an arc of an annulus. Injection strip 62a may be used as a sterile injection site for injecting an additive into container bag 36b. Bottom end 38a and administration site 42a are protected by a peelable layer formed from thermoplastic material 58.

Turning now to FIG. 1, layered parison 64 is shown. Only a portion of blow molding die 66 is shown. However, parison 64 is formed in a manner similar to the method previously described herein.

Parison 64 is formed by feeding first thermoplastic material 68 into blow molding die 66 and extruding first thermoplastic material 68. Second thermoplastic material 70 is simultaneously fed into blow molding die 66 and the simultaneously fed thermoplastic materials 66 and 68 are extruded from blow molding die 66 forming layered portion 72 of thermoplastic parison 64. Thereafter, feeding of first thermoplastic material 68 is terminated with the feeding of second thermoplastic material 70 continuing. Parison 64 is the result of this intermittent simultaneous feeding. In parison 64, first section 69 is free of an overlying layer. Second section 72 has an overlying layer, and third section 73 is free of an underlying layer.

Parison 64 is typically introduced between two mold cavity sections which are subsequently closed to form a mold cavity. Blowing of the parison then proceeds, followed by filling of the blown article, still in a mold cavity.

Figure 2:
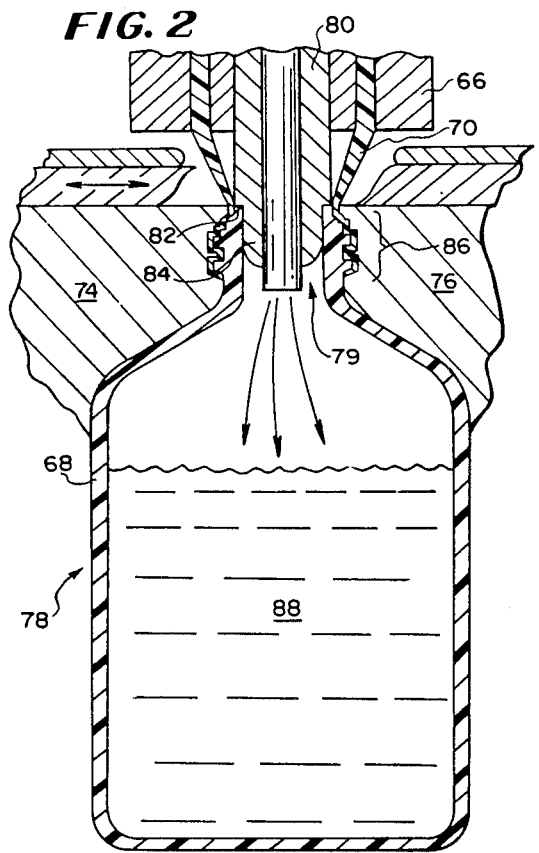

FIG. 2 shows mold cavity sections 74, 76 in their closed position after parison 64 has been blown, to form container 78 having outlet 79. Container 78 is comprised of first thermoplastic material 68, such as polypropylene. Fill/blow plug 80, within blow molding die 66, is shown projecting therefrom into the mold cavity formed by mold cavity section 74, 76. Shoulder 82 on end portion 84 of fill/blow plug 80 forms neck portion 86 of container 68. Container 78 is shown being filled with any suitable fluid 88. Second thermoplastic material 70 constitutes an outer layer such as polyvinyl chloride on neck 86 of container 78.

Figure 3:
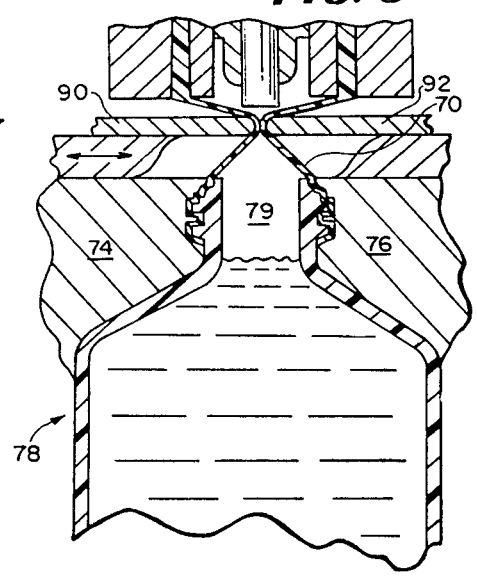
Figure 4:
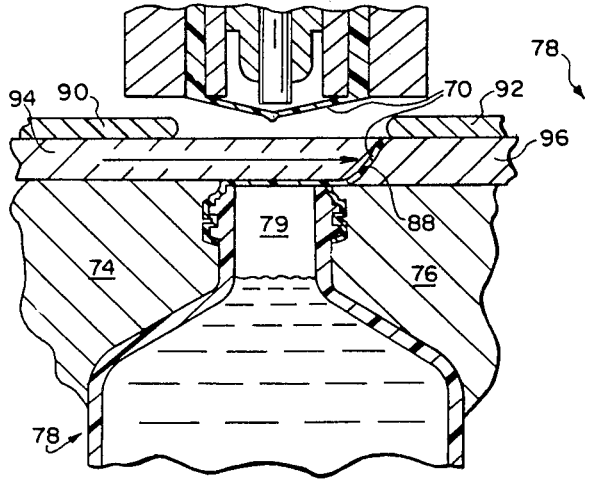

Slide plates 90, 92 of FIG. 3 are shown pinching off second thermoplastic material 70 after container 78 has been completely filled. FIG. 4 shows the final step in sealing container 78. Slide plates 90, 92 are opened after sealing slide plate 94 severs second thermoplastic material 70 sealing container 78 at outlet 79 and engaging sealing plate 96 to form tab 98.

Figure 5:
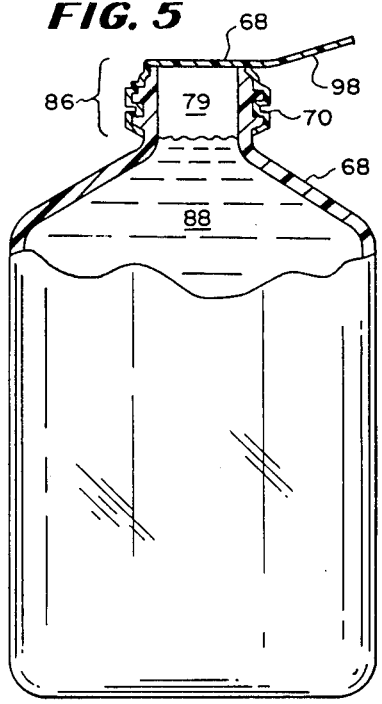

FIG. 5 shows closed container 78 filled with a suitable fluid 88. Container 78 is comprised of first thermoplastic material 68 which is covered by a layer of second thermoplastic material 70 at neck 86. Second ther-